(12) United States Patent
Toulisse et al.

(10) Patent No.: US 10,286,832 B2
(45) Date of Patent: May 14, 2019

(54) LIGHTING CORRECTOR FOR MOTOR VEHICLE HEADLAMP WITH IMPROVED ABUTMENT

(71) Applicant: AML SYSTEMS, Paris (FR)

(72) Inventors: Ludovic Toulisse, Drancy (FR); Hassan Koulouh, Le Pre Saint Gervais (FR)

(73) Assignee: AML SYSTEMS, Paris (FR)

( * ) Notice: Subject to any disclaimer, the term of this patent is extended or adjusted under 35 U.S.C. 154(b) by 0 days.

(21) Appl. No.: 15/533,543

(22) PCT Filed: Dec. 30, 2015

(86) PCT No.: PCT/FR2015/053770
§ 371 (c)(1),
(2) Date: Jun. 6, 2017

(87) PCT Pub. No.: WO2016/110630
PCT Pub. Date: Jul. 14, 2016

(65) Prior Publication Data
US 2017/0349086 A1    Dec. 7, 2017

(30) Foreign Application Priority Data

Jan. 6, 2015  (FR) ...................................... 15 50077

(51) Int. Cl.
*B60Q 1/068*      (2006.01)
*B60Q 1/076*      (2006.01)
(Continued)

(52) U.S. Cl.
CPC ........... *B60Q 1/0683* (2013.01); *B60Q 1/076* (2013.01); *F16B 41/002* (2013.01); *F21S 41/675* (2018.01); *B60Q 1/04* (2013.01)

(58) Field of Classification Search
CPC ..... B60Q 1/068; B60Q 1/0683; B60Q 1/0686
See application file for complete search history.

(56) References Cited

U.S. PATENT DOCUMENTS 4,343,031 A * 8/1982 Liebegott ............. B60Q 1/0683
362/289
5,251,114 A * 10/1993 Cantin ................... B60Q 1/076
362/272

(Continued)

FOREIGN PATENT DOCUMENTS

EP      0705729 A1    4/1996
EP      0985577 A1    3/2000
(Continued)

OTHER PUBLICATIONS

Machine Translation of EP0705729A1 filed Jun. 6, 2017.*

*Primary Examiner* — Robert J May
(74) *Attorney, Agent, or Firm* — Browdy and Neimark, PLLC

(57) ABSTRACT

The invention relates to a lighting height corrector for a motor-vehicle headlamp with a reflector, comprising an adjustment element (9) capable of modifying the tilt of said reflector (3), a threaded rod (10), and a means for actuating the translation (7) of said threaded rod (10), said adjustment element (9) being translatably movable by being screwed or unscrewed on said threaded rod (10), said adjustment element (9) including for this purpose at least one thread (92) shaped such as to engage with the threading of said threaded rod (10), characterised in that the threading of said threaded rod (10) includes, at the distal end thereof, at least one abutment (104*a*) shaped to limit the translation of the adjustment element (9) away from the threaded rod (10), by engaging with said thread (92).

12 Claims, 4 Drawing Sheets

(51) Int. Cl.
    *F16B 41/00*     (2006.01)
    *F21S 41/675*    (2018.01)
    *B60Q 1/04*     (2006.01)

(56) References Cited

U.S. PATENT DOCUMENTS

| | | | | |
|---|---|---|---|---|
| 5,673,991 A | * | 10/1997 | Eickhoff | B60Q 1/0683 362/272 |
| 5,678,915 A | * | 10/1997 | Shirai | B60Q 1/0683 362/289 |
| 2003/0043591 A1 | * | 3/2003 | Burton | B60Q 1/0683 362/528 |

FOREIGN PATENT DOCUMENTS

| | | |
|---|---|---|
| EP | 2112021 A1 | 10/2009 |
| EP | 2918447 A1 | 9/2015 |
| FR | 2786143 A1 | 5/2000 |
| FR | 2786143 A1 | 10/2014 |

\* cited by examiner

L1 < L2 < L3

Cross-section X-X

LIGHTING CORRECTOR FOR MOTOR VEHICLE HEADLAMP WITH IMPROVED ABUTMENT

The field of the present invention is that of headlamps for automobiles and, more particularly, that of level correctors for these headlamps.

It is necessary to adjust the height of the beam emitted by the headlamp so that, in the main beam headlamp position, it perfectly illuminates the road which the vehicle is travelling and, in the dipped beam headlamp position, it does not dazzle the drivers of vehicles coming in the opposite direction. For this it is important to be able to adapt the elevation angle of the headlamps of the vehicle as a function of the level of the vehicle.

An example of a headlamp according to the prior art is represented on FIG. 1. In general, a motor vehicle headlamp has a housing 1 closed by a protective glass 2. A lighting unit 5 is mounted inside the housing 1, facing the protective glass 2, in order to emit a light beam directed towards the road scene situated in front of the vehicle. This lighting unit includes a light source 4 installed in front of a reflector 3. The role of the reflector 3 is to direct the beam emitted by the light source 4.

Also, in order to orient the light beam and thus to adjust the height of said beam, it is known to modify the position of the reflector 3 inside the lighting unit 5. The position of the reflector 3 is generally modified by means of a lighting corrector 6. The lighting corrector 6 is an electro-mechanical device capable of causing pivoting of the reflector 3. For this the lighting corrector 6 includes an electrical module. This electrical module is generally equipped with a motor 7 and an electronic card. The electronic card can receive data relating to the level of the vehicle and can control the operation of the motor.

In normal use, the rotation of the motor results in the translation of a threaded rod on which is mounted a longitudinal sleeve 9 of which the end has the shape of a ball 90. The movement of the sleeve 9 results in the movement of the ball 90 in a capsule 3a fixed on the reflector 3, for example in the upper part of the reflector. This movement of the ball 90 results in the pivoting of the reflector 3 around a pivot 3b which is situated, for example, in the lower part of this reflector.

In addition to the device for correction of the height of the beam, described above, which is activated in normal use by the user or by an automatic system for correction of the level of the headlamp, it is necessary to provide a manual adjustment device 8 which is accessible only by an assembly operator or by a garage mechanic and which has the purpose of defining a reference height adjustment, from which the height correction device can act under the sole action of the electric motor. To this end, in response to a statutory obligation in most countries, the longitudinal sheath 9 is mounted freely rotatably on the threaded rod, in the manner of a screw-nut connection, in such a way as to be able to modify its longitudinal position on this rod. For this purpose the sheath 9 has, at its end opposite the ball 90, threads 92 (visible on FIG. 4) which are inserted into the threading of the threaded rod 10.

The manual adjustment device comprises, as can be seen on FIG. 2, a toothed wheel 81 which is supported by a guide sleeve 80 and an adjusting key 20. The sheath 9 is positioned in the guide sleeve 80 and includes guide ribs 91 which are aligned according to its direction of actuation. These ribs slide in grooves which are made on the internal face of the guide sleeve 80.

The operator, by acting on the key 20 of which the tip includes teeth which engage on the toothed wheel 81, can make the guide sleeve 80 turn in one direction or the other. As it turns it produces a rotation of the sheath 9 which moves on the threaded rod 10, by turning with said sleeve and by sliding on the internal grooves thereof. As the threaded rod 10 is now fixed in the absence of actuation by the electric motor 7, the rotation of the sheath 9 causes it to move longitudinally by screwing or unscrewing on the threading of the rod 10 and accordingly results in the movement of the ball 90. Once the reference adjustment is obtained, the operator removes the key 20 and the lighting corrector 6 can then operate, under the action of the electric motor 7, around this reference position which was given to the sheath 9.

One of the drawbacks of the existing devices is that they have a predefined mechanical travel and that exceeding this travel, due for example to an installation error or inattention by the operator, may lead to detachment of the sheath 9 from the mechanism 8, and in particular from the threaded rod 10. It is important that the manual adjustment device remains operational, even if it reaches the end of its travel, in order to avoid dismantling for repair or, worse, scrapping of the corrector.

The object of the present invention is to remedy these drawbacks by proposing a lighting corrector of which the mechanism remains operational when it reaches the end of its travel through the sheath for actuation of the reflector, with, in particular, a possibility of return after this end position is reached.

To this end, the invention relates to a lighting height corrector for a motor vehicle headlamp with a reflector, comprising an adjustment element capable of modifying the inclination of said reflector, a threaded rod, and a means for actuating the translation of said threaded rod, said adjustment element being movable in translation by screwing or unscrewing on said threaded rod, said adjustment element including for this purpose at least one thread shaped such as to co-operate with the threading of said threaded rod, characterised in that the threading of said threaded rod includes, at the distal end thereof, at least one shaped to limit the translation of the adjustment element away from the threaded rod, by co-operation with said thread.

The stop placed at the end of the threading makes it possible to prevent the adjustment element from disengaging from the threaded rod and therefore to avoid the need to remove the corrector in the event of an excessive torque applied away from this adjustment element.

In a particular embodiment, the corrector also has a manual adjustment sleeve surrounding the adjustment element, said adjustment element comprising at least one rib shaped so as to immobilise it in rotation relative to the sleeve by co-operation with means for guiding in translation which are supported by said sleeve.

According to the invention, the threaded rod is substantially in the form of a cylindrical bar in which said threading is formed, said threading being extended by a substantially cylindrical abutment of which the diameter is greater than that of the base of said threading, said abutment forming said stop for the distal end of said threading. This abutment ensures the retention of the adjustment element in the threading by virtue of the fact that its diameter always remains greater than that of the base of the threading.

In a particular embodiment, said stop is formed by a first flat face forming an angle with the plane perpendicular to the threading at its distal end, in such a way as to form a re-entrant female wedge. This shape of a female wedge forms a cover for the end of the thread running round in the threading and prevents the thread from passing over the threading.

More particularly, said first face forms an angle between 5 and 30° with the plane perpendicular to the threading.

Advantageously, the abutment includes at least one notch extending in a circular manner, on the angular sector of which the diameter of the abutment is reduced relative to the diameter of the abutment outside the notch. The purpose of this notch is to facilitate the entry of a thread into the threading of the rod.

More advantageously, the notch is limited laterally by two aligned flat faces having an inclination with respect to an axial plane in such a way that the angular opening in the lower part of the abutment is smaller than that in the upper part. This configuration further improves the entry of a thread into the threading of the rod.

In a particular embodiment, the adjustment element has the shape of a hollow cylinder of which the proximal part supports at least one helical sector forming said thread. The fact that the adjustment element can only have one helical sector facilitates its entry into a threading by deformation of said thread.

Advantageously, said thread extends from the interior of the cylinder and has on at least one of its ends a second flat face forming an angle with the plane perpendicular to the thread, in such a way as to form a projecting male wedge. More advantageously, said second face forms an angle between 5 and 30° with the plane perpendicular to the thread.

Even more advantageously, said thread has a projecting male wedge at each of its ends.

Preferably, the angular opening L2 of the thread is located between the angular opening L1 in the lower part of the abutment and the angular opening L3 in the upper part of said abutment.

In a particular embodiment, said threaded rod comprises, at its proximal end, at least one second stop limiting the translation of the adjustment element as it approaches said corrector.

Advantageously, the threading of the threaded rod terminates against a third flat face forming an angle with the plane perpendicular to the threading, in such a way as to form a re-entrant female wedge.

More advantageously, said third face forms an angle between 5 and 30° with the plane perpendicular to the threading.

The invention will be better understood, and other objectives, details, characteristics and advantages thereof will become more clearly apparent in the course of the following detailed explanatory description of an embodiment of the invention given by way of purely illustrative and non-limiting example, with reference to the appended schematic drawings. In these drawings:

FIG. 1, already described, is a schematic view, in section, of a motor vehicle headlamp equipped with a lighting corrector;

FIG. 2, likewise already described, is a frontal view of a detail of the headlamp lighting corrector of FIG. 1;

Figure 1:
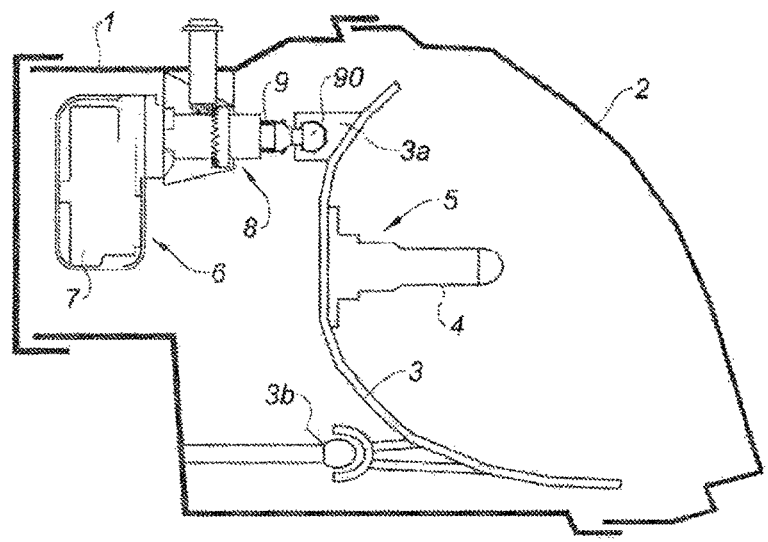
Figure 2:
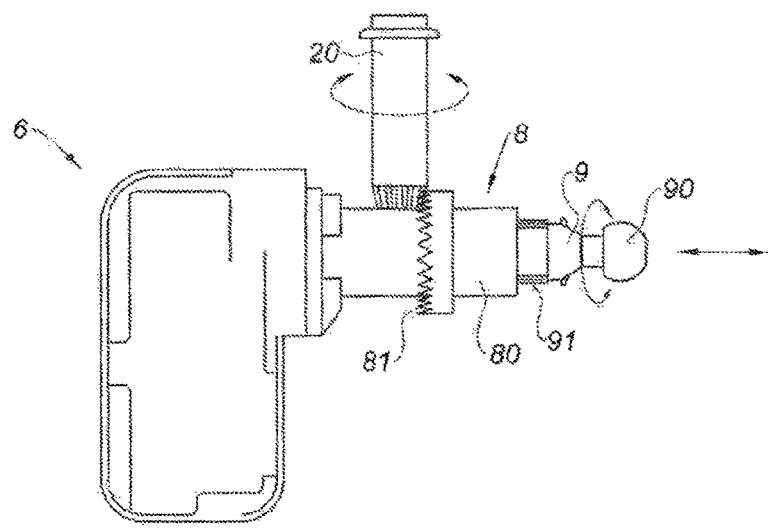
Figure 3:
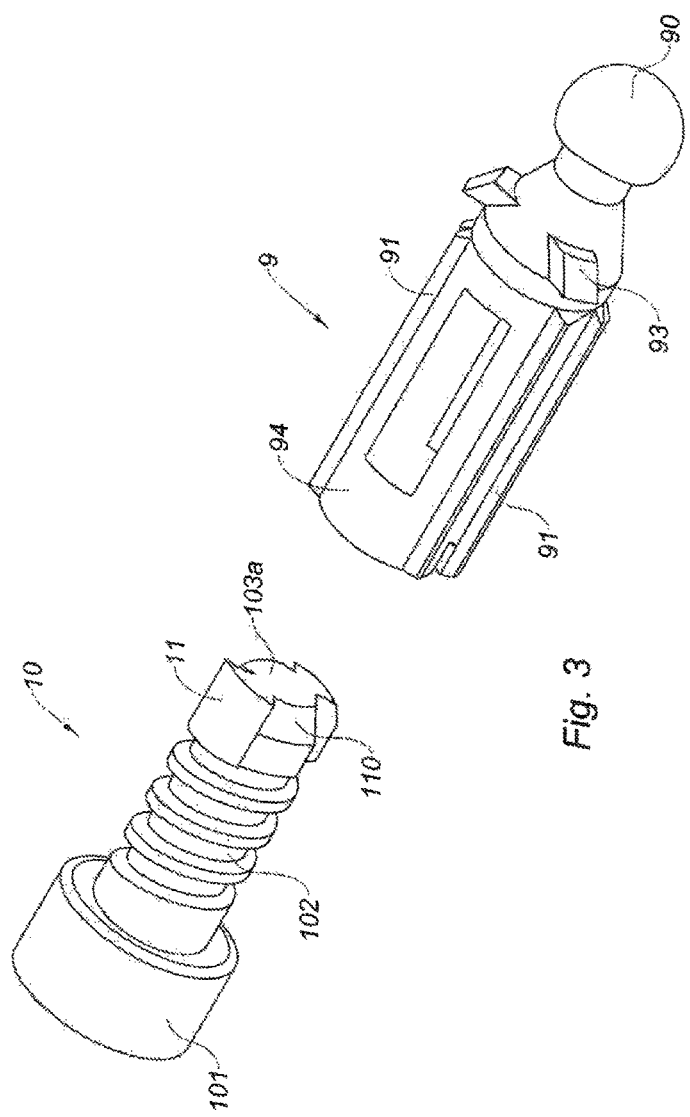
FIG. 3 is a perspective view, from the front, of a threaded rod and a sheath for adjusting a lighting corrector according to an embodiment of the invention.
Figure 4:
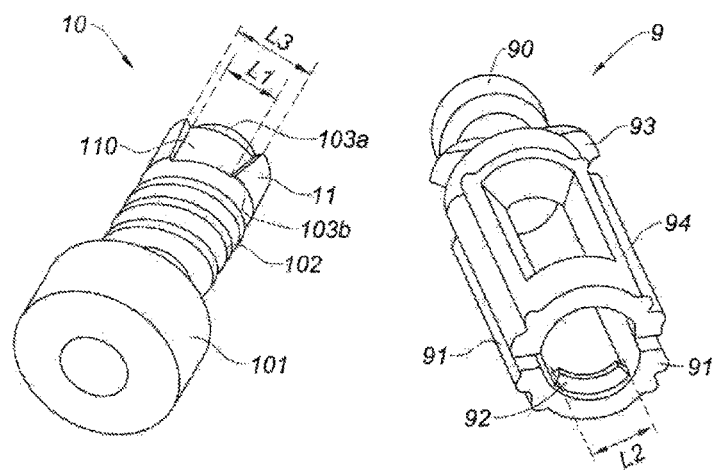
FIG. 4 is an perspective view, from the rear, of the threaded rod and the adjusting sheath of FIG. 3.

With reference to FIGS. 3 and 4, these show firstly the threaded rod 10 and the sheath 9 for adjusting a lighting corrector 6 according to the invention. The threaded rod has a substantially cylindrical base 101, from which a threaded cylindrical bar 102 extends which ends with an abutment device 11 which is intended to form a stop for the sheath 9 when this sheath arrives at the end of its adjustment travel, towards the exterior. For this purpose the abutment 11 has a substantially cylindrical shape which fits into the external diameter of the bar 102. It has a first radial face 103a at its end which is situated on the side where the adjusting sheath is located.

It also has a substantially radial second face 103b at its other end, which faces the threading of the bar 102, against which the threads 92 of the sheath 9 are positioned during an extension phase of the mechanism 8. The threads 92 of the sheath 9 which run round in the threading of the bar 102 encounter a stop 104a at the end of this threading, which prevents the sheath 9 from continuing its translation towards the exterior beyond a certain extent, thus delimiting, downwards, a range of adjustment for the position of the reflector 3.

The abutment 11 also has two notches 110 cut out of its circumference which are aligned, in a first approximation, according to the longitudinal direction and which are opposite one another circumferentially. Their purpose is to reduce the diameter of the abutment on a portion of its circumference, whilst retaining a diameter greater than that of the base of the threading. The purpose of reducing the diameter on the first portion is to allow the passage of the threads 92 of the adjusting sheath 9 during positioning thereof on the threaded rod 10, as will be explained in detail below.

The base of these two notches has on its upper part, i.e. the part through which the adjusting sheath 9 is introduced, a conical shape converging in the direction of the axis of the threaded rod 10, precisely for the purpose of facilitating this introduction. The base of the notch then continues with a cylindrical shape of which the diameter is slightly greater than that of the base of the threading of the bar 102.

With regard to the lateral walls of the notches 110, they are flat and aligned, not perfectly axially, but exhibiting a slight inclination with respect to an axial plane, in such a way that the angular opening L1 in the lower part of the abutment, i.e. at the level of the second radial face 103b, is, at the level of the notch, smaller than the angular opening L3 in the upper part, i.e. at the level of the first radial face 103a. This inclination produces a funnel shape, which completes the previous conical shape and against which the threads 92 can be positioned and can slide during the installation of the adjusting sheath 9 on the threaded rod 10.

The sheath 9 itself has the shape of a hollow cylinder 94 in which the threaded rod 10 can slide. At its distal end, i.e. the end opposite the threaded rod, the sheath carries the ball 90, via a substantially biconical surface which connects the diameter of the external cylinder 94 to that of the ball. Conventionally for example three radial stops 93, which extend radially towards the exterior with a flat face oriented on the side opposite the ball, are provided at the distal end of the external cylinder. They form a stop for the retraction of the sheath 9, bearing against the distal end of the guide sleeve 80. Thus they provide the limit of the range of upward adjustment of the reflector 3 when this reflector is moved by the electric motor 7. Finally, the external cylinder has longitudinal ribs 91 over its entire length in order to serve as a sliding guide in its movement within the guide sleeve 80, under the action of rotation of the guide sleeve itself in manual pre-adjustment mode, as explained above.

The terminal part of the hollow cylinder 94 has, at its proximal end (i.e. situated on the threaded rod 10 side), teeth in the form of helical segments, for example two such teeth, which extend towards the interior and which form the threads 92 which co-operate with the threading of the bar 102 of the threaded rod 10. These two threads have a circular extent L2 and extend along a helix of which the pitch and the span correspond substantially to the pitch and the depth of said threading.

Figure 5:
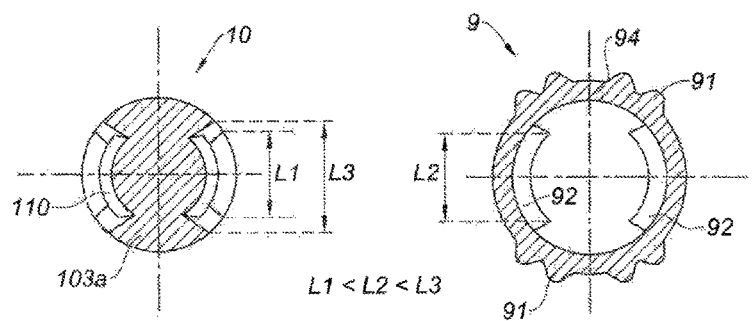
FIG. 5 is a sectional view of the threaded rod and the adjusting sheath of FIG. 3.

With reference now to FIG. 5, this shows, respectively viewed from above and viewed from below, the threaded rod 10 and the sheath 9. It can be seen that the angular opening L2 of each of the threads 92 of the terminal part of the sheath 9 is smaller than the angular opening L3 of the upper part of the abutment 11, but that it is also slightly greater than the angular opening L1 of the lower part of this same abutment. In this way, the threads 92 penetrate without problems into the upper part of the abutment 11 and are guided towards the lower part of this abutment by its conical part and by the lateral walls of the corresponding notch 110. An axial pressure of the sheath 9 against the abutment 11 is sufficient, by virtue of the resilience of the threads 92, to make them pass through the lower part of the abutment and engage in the threading of the bar 102. The relative rotation of the sheath 9 with respect to the threaded rod 10 is then made possible by the movement of the threads 92 within the bar 102. Then, by screwing or unscrewing on the threaded rod 10, this produces the required translation of the sheath 9 and of its ball 90.

Once the sheath 9 is placed on the threaded rod 10, it is important that it remains there and that the sudden application of a torque for the rotation of the threaded rod, which would be excessive, cannot cause the disconnection of the threads 92 from the threading of the bar 102, either at the proximal end or at the distal end of the bar. For this, first of all the length L2 of the threads 92 is, as stated previously, greater than the length L1 of the notch 100 in its lower part. Therefore the longitudinal ends of the threads 92, extending on both sides beyond the angular opening of the notch 110, remain locked below the second radial face 103b of the abutment 11. Then a male and a female wedge device is positioned at the ends of not only the threads 92 but also of the threading of the bar 102, as illustrated on FIGS. 6 to 9.

Figure 6:
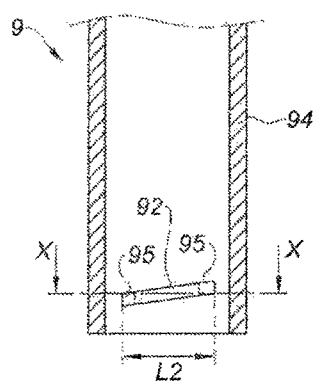
FIG. 6 is an axial sectional view of the sheath of FIG. 3.
Figure 7:
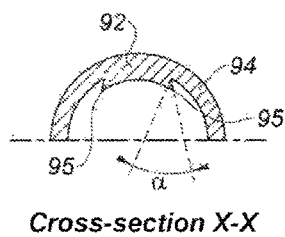
FIG. 7 is a radial sectional view of the sheath of FIG. 6.

Thus FIGS. 6 and 7 show a sheath 9 in section (FIG. 6) along an axial plane which reveals a thread 92 which extends substantially radially from the internal wall of the sheath. Viewed from the front, the thread has a parallelepipedal shape wound in a helix, with the exception of its two end parts of which the thickness decreases progressively as it becomes detached from the internal wall of the sheath. The circular span of the thread increases progressively as it is distanced from the internal wall in such a way as to form a projecting male wedge 95 at each of its ends (FIG. 7). This male wedge is intended to be inserted in a female wedge which is positioned at the end of the threading of the bar 102 as will be described in greater detail in relation to FIGS. 8 and 9.

FIG. 7 shows a cross-section X-X of the sheath 9 along a radial plane, at the level of a thread 92. This thread extends from the internal wall of the sheath 9 over an angular sector of amplitude L2, and at its two ends it has wedge shapes 95, the amplitude of the thread against the internal wall being less than its amplitude at the centre of the sheath. This thinning of the thread at its ends makes it possible, firstly, to have the flexibility necessary in order to allow it to pass into the notch 110 of the threaded rod in spite of its greater amplitude and, secondly, to form a projecting male wedge 95 which may be inserted in a female wedge positioned at the end of the threading of the bar 102.

Figure 8:
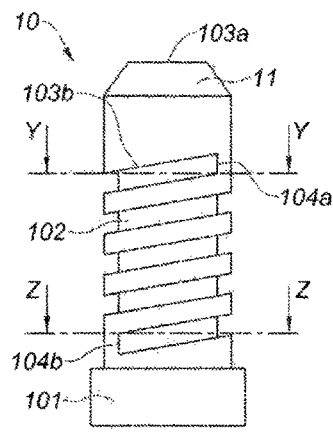
FIG. 8 shows a frontal view of the threaded rod of FIG. 3.

FIG. 8 shows the threading of the threaded rod 10, which extends helically along the bar 102. This threading ends with two flat faces forming circular stops, a first stop 104a being situated at the distal end of the bar, just below the second radial face 103b of the abutment 11, and a second stop 104b being situated at the proximal end, just above the base 101. These two stops are not stops oriented in an axial plane but they are nevertheless substantially parallel to the axial direction, their plane forming an angle with an axial plane. In this way they have a wedge shape as detailed in relation to FIG. 9.

Figure 9:
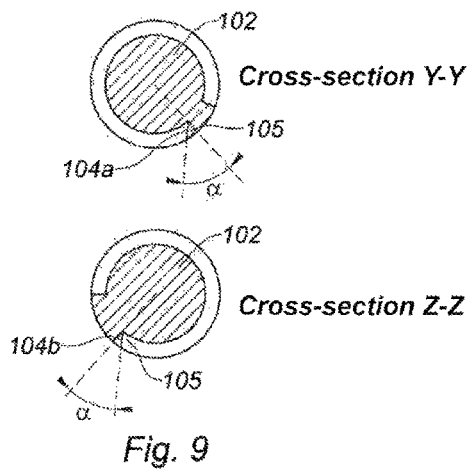
FIG. 9 is a sectional view of the threaded rod of FIG. 8, according to two separate radial planes.

FIG. 9 shows two cross-sections of the threaded rod 10, respectively Y-Y and Z-Z at the level of the distal and proximal ends of the bar 102. The cross-section Y-Y corresponds to the position of the distal stop 104a on the threading whilst the cross-section Z-Z corresponds to the position of the proximal stop 104b. On one and on the other of the two cross-sections it can be seen that the stop zone which closes the threading has a diameter equal to that of the abutment 11. But, as indicated previously, the face of this stop which closes the threading is not oriented radially: it has a re-entrant female wedge shape 105, the angular amplitude of the stop zone decreasing as it passes from the diameter of the abutment at the exterior to a more restricted amplitude as it rejoins the base of the threading.

For reasons of stability of the threads 92 in the threading of the bar 102 when the threads bear against one of the ends 104a or 104b, the angle $\alpha$ formed by the stop faces of the wedges, both male 95 and female 105, with the direction of the corresponding radial plane is preferably chosen to be between 5 and 30°.

The operation of a lighting corrector 6 according to the invention, and in particular the positioning of the threaded rod 10 thereof in its sheath 9 and the relative movements of these two components, will now be described.

The threaded rod 10 is assumed to be already positioned on the lighting corrector 6 and connected to the electric motor 7 for actuation of the corrector in normal operation. The operator causes the sheath 9 to enter the guide sleeve 80 and fixes it in rotation therewith by the co-operation of the ribs 91 of the sheath with the internal grooves of the sleeve. He then positions this assembly around the threaded rod 10 by ensuring that the threads 92 of the sheath are located facing the notches 110 made in the abutment 11 of the threaded rod 10. By means of suitable axial support, the operator makes the threads 92 pass forcibly over the abutment 11 and in particular the base of the notch 110, in order to be located in the distal part of the threading of the bar 102, close to the distal stop 104a. From this moment any action in rotation of the guide sleeve 80, for example by a rotation triggered by the adjusting key 20, will trigger a rotation of the sheath 9 with respect to the threaded rod 10 and a variation, by screwing or unscrewing, of the relative positioning of these two components. As the threaded rod is fixed in rotation, the rotation of the key 20 and accordingly of the sleeve 80 will produce a longitudinal movement of the sheath 9 and of its terminal ball 90. Thus the rotation of the key 20 makes it possible to position the reflector 3 in the required reference position.

It may be noted, as can be seen on FIG. 8, that the distal stop 104a is offset angularly on the threaded rod 10 with respect to the notch 110 in such a way that, when the threads 92 bear against the distal stop 104a, they are not positioned opposite the notch and cannot leave the threading of the bar 102 axially, in a similar manner to what happens, in the opposite direction, during the installation of the sheath 9 on the threaded rod 10.

The invention likewise provides for preventing a possible disconnection of the sheath and of the threaded rod when an operator exerts an excessive force on the adjusting key whilst the threads 92 have reached one of the stops 104a or 104b at the end of the threading. If the faces of these stops, as well as the lateral faces of the threads 92, were oriented in an axial plane, on the one hand the frontal co-operation of the two walls of the stop and of the thread could produce battering effects on the surfaces when they come abruptly into contact with one another, and, on the other hand, there would be a risk that the threads 92 would become deformed and go beyond the frontal stop 104a or 104b at the end of the threading. In the event of unscrewing, the sheath would be disconnected from the threaded rod, without it being possible to reconnect it by screwing in the opposite direction to the adjusting key 20. The incident would then necessitate a complete disassembly of the lighting corrector, or even scrapping of the corrector in its entirety.

The invention remedies this defect by the positioning of two wedges, a male wedge 95 on the thread 92 of the sheath 9 and a female wedge 105 on the stops 104a and 104b at the end of the threading. These wedges co-operate in a plane which is offset in a circular manner, between 5 and 30°, with respect to an axial plane. Thus at the end of the threading, the male wedge 95 is inserted under the female wedge 105, and the cover function provided by the female wedge prevents the male wedge from leapfrogging over it and escaping from the threading. This function is ensured both in a direction of screwing of the sheath by the proximal stop 104b, and of unscrewing of the sheath by the distal stop 104a.

The invention claimed is:

1. A lighting height corrector for a motor vehicle headlamp with a reflector, comprising:
    an adjustment element configured to modify the inclination of said reflector,
    a threaded rod comprising threading, and
    a means for actuating the translation of said threaded rod, said adjustment element being movable in translation by screwing or unscrewing on said threaded rod,
    wherein said adjustment element comprises at least one thread shaped to co-operate with the threading of said threaded rod,
    wherein the threading of said threaded rod includes, at a distal end thereof, at least one first stop shaped to limit the translation of the adjustment element away from the threaded rod, by co-operation with said at least thread,
    wherein the threaded rod comprises a cylindrical bar in which said threading is formed, a substantially cylindrical abutment of extending from said threading and having a diameter that is greater than a diameter of a base of said threading, said abutment forming said at least one first stop at the distal end of said threading,
    wherein said at least one stop is formed by a first flat face forming an angle with the plane perpendicular to the threading at its distal end, in such a way as to form a re-entrant female wedge,
    wherein the adjustment element has the shape of a hollow cylinder having a proximal part supporting at least one helical sector forming said thread, and
    wherein said thread extends from an interior of the cylinder and comprises at least one end of the thread comprising a projecting male wedge comprising a second flat face forming an angle with a plane perpendicular to the thread.

2. The corrector according to claim 1, also including a manual adjustment sleeve surrounding the adjustment element, said adjustment element comprising at least one rib (91) shaped so as to immobilize said adjustment element in rotation relative to the sleeve by co-operation with means for guiding in translation which are supported by said sleeve.

3. The corrector according to claim 1, wherein said first face forms an angle between 5 and 30° with the plane perpendicular to the threading.

4. The corrector according to claim 1, wherein the abutment includes at least one notch extending in a circular over an angular sector of the abutment in which a diameter of the abutment is reduced relative to a diameter of the abutment outside the at least one notch.

5. The corrector according to claim 4, wherein the at least one notch is limited laterally by two aligned flat faces having an inclination with respect to an axial plane in such a way that an angular opening defined in a lower part of the abutment is smaller than that in the upper part.

6. The corrector according to claim 5, wherein the angular opening of the thread is located between an angular opening defined in the lower part of the abutment and the angular opening defined in an upper part of said abutment.

7. The corrector according to claim 1, wherein said second face forms an angle between 5 and 30° with the plane perpendicular to the thread.

8. The corrector according to claim 7, wherein said at least one projecting male wedge comprises a projecting male wedge at each of end of said thread.

9. The corrector according to claim 1, wherein said threaded rod comprises, at its proximal end, at least one second stop limiting the translation of the adjustment element towards said corrector.

10. The corrector according to claim 9, further comprising a re-entrant female wedge comprising a third flat face against which the threading of the threaded rod terminates, the third flat face forming an angle with the plane perpendicular to the threading.

11. The corrector according to claim 10, wherein said third face forms an angle between 5 and 30° with the plane perpendicular to the threading.

12. A lighting height corrector for a motor vehicle headlamp with a reflector, comprising:
    an adjustment element configured to modify the inclination of said reflector, a threaded rod comprising threading, and
    a means for actuating the translation of said threaded rod, said adjustment element being movable in translation by screwing or unscrewing on said threaded rod, wherein
    said adjustment element comprises at least one thread shaped to co-operate with the threading of said threaded rod,
    wherein the threading of said threaded rod includes, at a distal end thereof, at least one first stop shaped to limit the translation of the adjustment element away from the threaded rod, by co-operation with said at least thread,
    wherein the threaded rod comprises a cylindrical bar in which said threading is formed, a substantially cylindrical abutment of extending from said threading and having a diameter that is greater than a diameter of a base of said threading, said abutment forming said at least one first stop at the distal end of said threading, wherein said at least one stop is formed by a first flat face forming an angle with the plane perpendicular to the threading at its distal end, in such a way as to form a re-entrant female wedge, and wherein the abutment includes at least one notch circularly extending over an angular sector of the abutment in which a diameter of the abutment is reduced relative to a diameter of the abutment outside the at least one notch.

* * * * *